Jan. 4, 1944.                    C. PIZZI                    2,338,456
                        METHOD OF PREPARING BALES
                            Filed April 9, 1941

Inventor,
C. Pizzi
By: Glascock Downing & Seebold
Attys.

Patented Jan. 4, 1944

2,338,456

UNITED STATES PATENT OFFICE 2,338,456

METHOD OF PREPARING BALES

Carlo Pizzi, Alessandria, Italy; vested in the Alien Property Custodian

Application April 9, 1941, Serial No. 387,735
In Italy April 10, 1940

2 Claims. (Cl. 100—14)

In the straw presses now in use the bales are bound by means of two parallel wires, which are led along the four sides of the bale; the necessary length of wire for binding a bale must therefore be about five times the length of the bale.

The object of this invention is to provide a binding method for straw bales, by which the required length of wire is reduced to one fifth.

The binding method according to this invention consists in passing a wire or cord through the straw in the direction of the compression of the bale in the press chamber, said wire or cord being anchored at the bale heads to bars or the like.

The straw is thus maintained in the compressed state and to prevent loosing of the end straw layers from the bar, two or more further bars are fitted crosswise between the bale end and the anchoring bars. It has been found in practice that the bale thus bound may be handled as usual without any risk of spreading open.

The binding according to this invention may be effected in different manners. The bale may for instance be temporarily tied while in the press chamber by means of two steel wires, cords or the like of the required length and provided with easily disassemblable fastening means. The bale is then withdrawn from the press. The wire which is provided at one end with a bar is led by means of a needle or the like through the straw in the direction of the longitudinal axis of the bale and the bar is tied at the other end, whereupon the temporary binding wires are removed. They may be used again for tying other bales.

This method has the advantage that it is not necessary to alter the press or the binding operation while the bale is in the press chamber; it only requires to add to the press as accessories some cords for the temporary binding and employ workers for the final binding according to this invention. This higher cost of binding is largely made up by the economy in wire.

By suitably modifying the binding press it is also possible to effect the final binding in the press chamber before discharging the bale.

The annexed drawing shows, by way of example, an embodiment of this invention.

Figure 1:
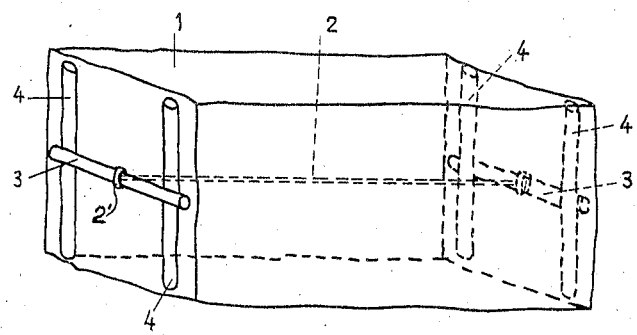
Fig. 1 is a perspective view of a straw bale tied in accordance with the invention.
Figure 2:
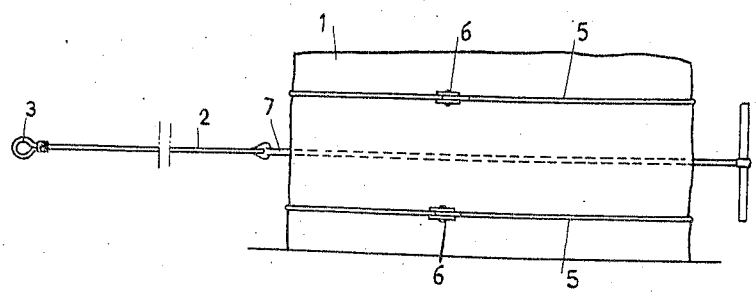
Fig. 2 is a side view of a bale provided with the temporary binding and ready for the final binding.
Figure 3:
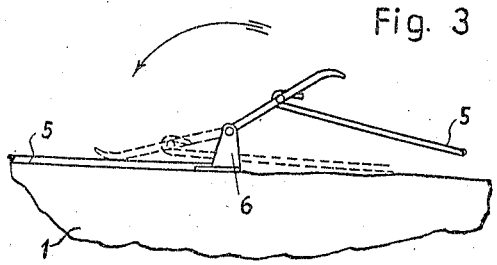
Fig. 3 shows a detail.

Referring to the drawing, 1 denotes a straw bale of the usual size, which is maintained in the compressed state by means of a wire, hemp cord 2 or the like, led through the bale along the longitudinal axis of the bale and anchored by loops 2' to end bars 3, which may be of wood or other material.

In order to distribute the compression effected by the bars 3 over the surface of the bale ends, other bars or the like, 4, are fitted between said heads and the anchoring bars. It will be easily seen that the length of wire or the like required for tying a bale is equal to the length of the latter plus a portion for anchoring the wire to the end bars 3. On comparing this length to the length now used for the double binding, it appears that with the binding method according to this invention more than ⅘ of the wire now used for bale tying may be spared.

The central tying is effected in the following manner. The bale on reaching the bottom of the press chamber is temporarily tied by means of two steel wires 5 or other suitable binding means in the same manner as it is presently done with the usual wire.

The steel wires 5, which are included in the press accessories, are of the exact length to form the double binding and carry at their ends a pivot bracket eye 6. A wire or cord 2 having a bar 3 at one end is led through the straw bale by means of a needle 7. The wire is tied to a bar 3 at the other end; the wires 5 are removed and may be used for tying the bales successively bundled and the bars, boards, or the like, 4, are placed on the bale ends.

Obviously this binding method may be used for any kind of fodder or fibrous material.

If the bale is of large size and the material spreads easily, as hay for instance, two or more wires are led through the bale instead of a single wire as for bales of normal size.

I wish it to be understood that I do not desire to be limited to the exact details of construction shown and described, for obvious modifications will occur to a person skilled in the art.

What I claim is:

1. A method of binding a bale of straw, fodder or the like, while said bale is under compression including the steps of leading a wire axially through the bale, anchoring each end of said wire to a bar arranged on each end of the bale and inserting additional bars between the bale and the first mentioned bars, the additional bars being arranged at right angles to the first bars for distributing the pressure over the adjacent surface of the bale.

2. A method as claimed in claim 1 including the step of applying temporary binding means to the bale before said wire has been led through the bale, and subsequently removing the temporary binding means.

CARLO PIZZI.